United States Patent [19]
Bollinger et al.

[11] Patent Number: 4,604,174
[45] Date of Patent: Aug. 5, 1986

[54] HIGH FLOW ELECTROFILTRATION

[75] Inventors: James M. Bollinger, Stamford; Peter R. Klinkowski, Norwalk, both of Conn.

[73] Assignee: Dorr-Oliver Incorporated, Stamford, Conn.

[21] Appl. No.: 728,957

[22] Filed: Apr. 30, 1985

[51] Int. Cl.$^4$ .............................................. C02F 1/46
[52] U.S. Cl. .............................. 204/151; 204/182.1; 204/182.2; 204/182.4; 204/301
[58] Field of Search .................. 204/151, 152, 182.1, 204/182.2–182.4, 301

[56] References Cited

U.S. PATENT DOCUMENTS

| | | | |
|---|---|---|---|
| 3,657,106 | 4/1972 | Smith | 204/301 |
| 3,718,559 | 2/1973 | Wallace | 204/301 |
| 4,043,896 | 8/1977 | Ahlgren | 204/301 |
| 4,123,342 | 10/1978 | Ahlgren | 204/301 |
| 4,204,929 | 5/1980 | Bier | 204/301 |
| 4,468,306 | 8/1984 | Freeman et al. | 204/301 |

Primary Examiner—John F. Niebling
Assistant Examiner—Terryence Chapman
Attorney, Agent, or Firm—Harold M. Snyder; Burtsell J. Kearns; Paul D. Greeley

[57] ABSTRACT

An electrically augmented crossflow filter device in which a feed stream containing solid particulate matter is flowed between opposed walls while a pressure differential is imposed across a first of said walls comprising a filter medium to produce a flow of filtrate therethrough in a direction perpendicular to the direction of flow of the feed stream. At the same time, an electric field is imposed on the feed stream in a direction perpendicular to the direction of the flow of the feed stream, causing the solid particulate matter in the feed stream to tend to move toward the second of said walls which comprises an ion-pervious member. Cake formation on the latter ion-pervious wall is limited or precluded by the velocity of the feed stream while the feed stream thickens in passing between the walls to form the product stream. The electrode which is located behind the second, or ion-pervious, wall is immersed during operation in a protective stream of a selected electrolyte.

28 Claims, 9 Drawing Figures

HIGH FLOW ELECTROFILTRATION

The present invention is directed to an electrically augmented crossflow filter device and to a process for utilizing that device in filtration.

BACKGROUND OF THE INVENTION

Electrically augmented filtration devices and processes are in commercial operation, but those in use have involved immersing anodic and cathodic electrode assemblies in a slurry bath, depositing a cake on certain of the electrode assemblies and thereafter removing the cake, as product, from those assemblies by means such as doctoring or blow-back. Quite often, however, the desired final product is a slurry, rather than relatively dry cake, so that the cake product must be reslurried to the desired moisture content; a retrogressive process step, so to speak. Then too, the commercial process just described has some of the characteristics of a batch-type operation; each of the electrode assemblies on which cake is to be deposited, as stated above, passing through a cycle of immersion, cake deposition, cake doctoring and reimmersion. Such batch-type processes tend to require rather complex and expensive mechanical equipment and frequent maintenance attention.

Process and apparatus for carrying out dewatering of suspensions are disclosed in U.S. Pat. No. 4,107,026, issued Aug. 15, 1978, U.S. Pat. No. 4,168,222, issued Sept. 18, 1979, U.S. Pat. No. 4,170,529, issued Oct. 9, 1979, U.S. Pat. No. 4,207,158, issued June 10, 1980, U.S. Pat. No. 4,303,492, issued Dec. 1, 1981, U.S. Pat. No. 4,419,209, issued Dec. 6, 1983, and copending application, U.S. Ser. No. 222,057, filed Jan. 2, 1981. The entire disclosures of these patents and application are incorporated herein by reference thereto.

In these earlier disclosures, self-contained hollow electrode assemblies are provided which are normally submerged in the suspension, but bodily removable therefrom for inspection or other purposes. These hollow electrode assemblies comprise two types of wall surfaces: ion-pervious walls for electrode assemblies of one polarity and liquid-pervious walls for electrode assemblies of the opposite polarity.

In operation, with electrode assemblies immersed in the suspension, a source of vacuum is connected to the interior of the electrode assemblies having liquid-pervious walls to provide a controllable pressure differential, thereby producing a flow of carrier liquid through the filtration surfaces, while the solids migrate in the opposite direction, under the influence of the electric field, to deposit as cake upon the electrode assemblies having ion-pervious walls. Filtrate or permeate liquid, that is, carrier liquid freed of solids, is withdrawn or pumped from the interior of the liquid-filled hollow electrode structure at a controllable rate.

As indicated, cake deposition occurs on the hollow electrode assemblies having ion-pervious surfaces: these electrode assemblies are filled with an electrolyte and have an electrode element therein immersed in the electrolyte. These electrode elements are thus isolated from direct contact with the suspension. The electrolyte is specially selected for high conductivity and compatibility with the electrode element. By compatibility is meant the relatively non-corrosive character of the electrolyte under the conditions that ordinarily prevail within the hollow electrode assembly. Since decomposition or evolution products and heat are generated at the electrode element within the hollow ion-pervious assembly, provision is made for a flow of electrolyte into and through the electrode chamber so that foreign products, including gases, and heat are swept out of the chamber and a relatively constant predetermined electrolyte composition is maintained.

The ion-pervious wall of the electrode assembly in these prior art structures comprises a chemically neutral filter media, ion exchange membrane, solid polymeric electrolyte, permeable porous membrane or structures incorporating combinations thereof, which, if film-like in nature or otherwise requiring support, may be backed by a chemically and electrically neutral grid so that a planar deposition surface is presented to the slurry being treated. Since the cake will form on this deposition surface member during electrofiltration and must be removed by contact with doctoring blades, a friction cage or spacing means may be provided to protect the somewhat fragile surface member from direct contact with the doctoring blades. The friction cage comprises a thin, open screenwork of relatively hard material covering the deposition surface member for contacting the doctor blades, while spacing means may comprise strips of plastic materials, such as Delrin acetal resin arranged in a frame-like configuration and of a thickness sufficient to prevent contact between the doctor blade and the deposition surface. For the purpose of cake recovery, the electrode assembly is raised to a position of emergence from the suspension, with the layer of collected solids or cake layer adhering thereto. Since the electrolyte remains within the electrode assembly in the raised position, a vacuum is applied internally of the electrode to reduce the pressure on the deposition surface member and so prevent rupture of the member. When the electrode assembly is immersed in operation, the vacuum applied internally serves to remove gaseous products, such as chlorine, oxygen or carbon dioxide evolved at the electrode element.

A somewhat different filtration process, crossflow filtration, has been proposed in the past and the following articles describe this concept:

J. D. Henry, "Cross-Flow Filtration," *Recent Developments in Separation Science*, Vol. 2, pages 205-224, 1972, discusses the application of a flow tangential to the filter medium to minimize accumulation of particles on the filter surface. The discussion does not extend to the use of an electric field to promote separation of solids in the slurry.

Henry et al, "A Solid/Liquid Separation Process Based on Cross-Flow and Electrofiltration," *AICHE Journal*, Vol. 23, No. 6, pages 851-859, November, 1977, discusses a mathematical model and experimental data for electrofiltration in a crossflow mode of suspensions of kaolin clay or oil emulsions from an aqueous solution. This paper does not describe protection means for an electrode in the process.

SUMMARY OF THE INVENTION

The crossflow electrofiltration device of the present invention comprises an elongated housing having a feed-product channel therein with an inlet for feed at one end thereof and a product outlet at the other end of the channel. One wall of the channel is composed of a liquid-pervious filter medium and a second wall of the channel is composed of an ion-pervious surface member. The suspension or slurry to be treated passes through the feed-product channel between and in contact with both walls. The liquid-pervious filter medium wall separates the feed-product channel from a filtrate chamber or channel and there is an electrode within the filtrate chamber. An outlet is provided from the filtrate chamber so that filtrate may be withdrawn. The ion-pervious surface member separates the feed-product channel from an electrolyte chamber or channel and there is an electrode within the electrolyte chamber immersed in a protective electrolyte. An inlet and an outlet are provided for the electrolyte chamber so that fresh electrolyte may be continuously circulated through this chamber.

Differential pressure and electroosmotic pumping across the liquid-pervious filter media forces liquid from the flowing suspension through the filter media into the filtrate chamber. Differential pressure is achieved by pressurizing the feed-product channel hydraulically, such as with a feed pump, and/or applying vacuum to the filtrate chamber. The electric field established between the opposed electrodes also tends to impel the solid particles of the suspension toward the ion-pervious surface member. The current density due to the applied field is in the range from 0.1 and 135 amps/ft$^2$. A thin cake of these solid particles may form on part or all of the ion-pervious surface member, but the thickness of such a cake is limited by the velocity of the suspension passing through the feed-product channel, any excessive buildup of cake being sheared away by the flowing suspension. Typically, velocities in the range of 1 to 20 ft/sec are sufficient to prevent cake formation on the ion-previous surface In any case, cake formation on the ion-previous surface is generally undersirable.

The suspensions to be dewatered may be slurries of polyvinyl chloride, kaolin, ultrafine coal, alumina, TiO$_2$, calcium carbonate, humate, magnesium aluminum hydroxide, or other polymer latexs for example. The average particle size of the polyvinyl chloride and kaolin solids will be less than 10 microns while the ultrafine coal solids will be less than 100 microns.

DESCRIPTION OF THE DRAWINGS

The present invention is illustrated in the accompanying drawings wherein.

DETAILED DESCRIPTION

Figure 1:
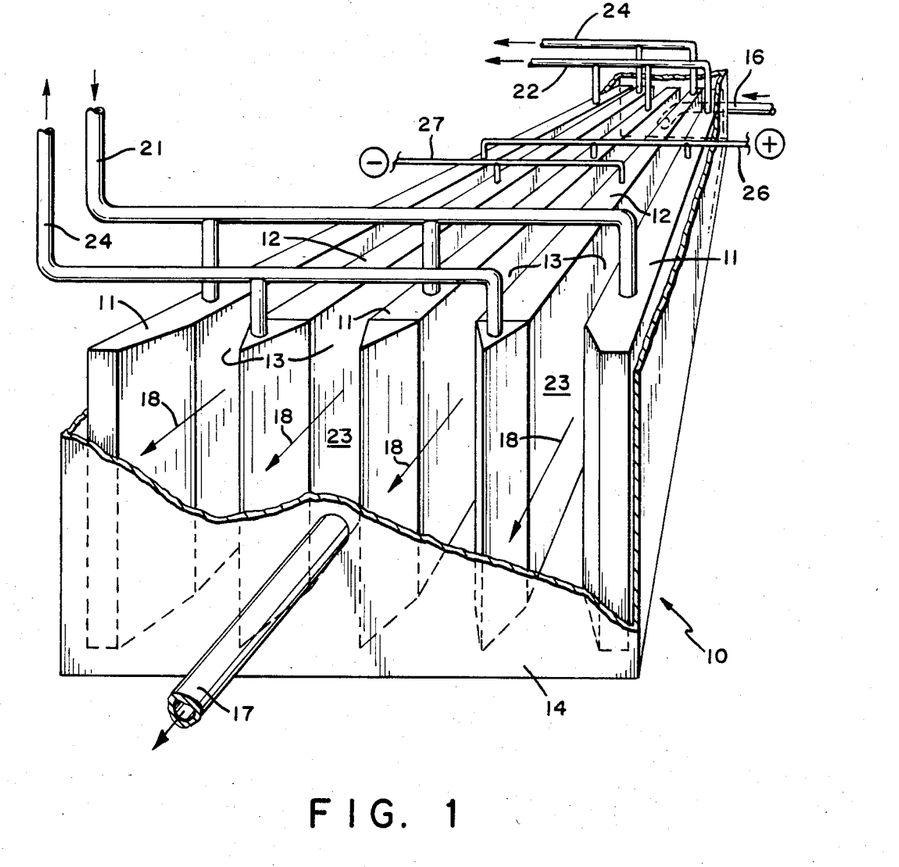
FIG. 1 is a schematic diagram of an electrically augmented crossflow filter device in accordance with the invention.

Referring to the drawings, there is schematically illustrated in FIG. 1 the crossflow electrofiltration unit of this invention, including a plurality of elongated electrode assemblies arranged in parallel alignment. In this configuration, anode assemblies 11 alternate with cathode assemblies 12 and the anode assemblies are spaced from the cathode assemblies by feed-product channels 13. The array of anode assemblies and cathode assemblies may be positioned within a confining structure asuch as the housing indicated at 14 which is provided with a feed inlet 16 and a product outlet 17. The direction of flow through the feed-product channel between the spaced electrodes is indicated by arrows 18. Anolyte is introduced into the anode assemblies 11 through the inlet conduit 21 and anolyte is withdrawn from the anode assemblies 11 through the outlet conduit 22. Filtrate from the feed stream is drawn through liquid-previous faces or filter media 23 of the cathode assemblies through the filtrate withdrawal conduit 24. Electrical conductors 26 and 27 provide the necessary electrical connection to the anode assemblies 11 and cathode assemblies 12.

In operation, a flow of a feed slurry is established through the feed-product channels 13 and a pressure differential is thereby established across the cathode filter media 23, such that the pressure in the feed-product channels exceeds the pressure within the cathode assemblies. In addition, the anode assemblies and cathode assemblies are energized by means of the electrical conductors 26 and 27 so that an electric potential is established across the feed-product channels 18. The combination of the pressure differential across the cathode filter media 23 and the electric field causes liquid from the feed slurry to pass into the cathode assemblies 12, from which it is removed through the filtrate withdrawal conduits 24. The transport mechanism through the cathode filter medium is a combination of pressure driven and electroosmotic driven processes. At the same time, the electrical potential across the feed-product channels 13 causes the solids in the slurry to tend to move toward the anode assemblies 11. Some portion of the solids may deposit on the anode assemblies 11; however, if solids initially deposit, accretion of additional solids is limited by the erosive character of the flow of slurry in channels 13 as it passes over the surface of the anode surface member. The cake, if any, on the anode assembly thus reaches an equilibrium thickness, dependent on the electric field strength and the flow velocity of the slurry. The anode cake, if present, tends to protect the anode surface member from abrasion and may have certain other advantages. The aforementioned tendency of the solids in the slurry to move toward the anode assembly has the advantage that little or no cake is deposited on the cathode, thus minimizing or eliminating any "blinding" of the cathode filter media 23, so that a relatively high filtrate flow may be established and maintained.

In the initial work with electrofiltration apparatus, both the liquid-pervious surfaces and the ion-pervious surfaces of the electrode assemblies were made of a woven fabric, Dynel. An unwoven fabric could also have been used. Such surfaces were operative on the cathode assemblies (the liquid-pervious surfaces), but had the characteristic, in that application, that particles in suspension would pass through the relatively "open" fabric material with the filtrate during initial operation of the electrofilter, even though the bulk of suspended solids was attracted to the anode assembly. This condition, leading to "cloudy" filtrate, would prevail until, after operation for a period of hours or days, a thin cathode cake built up on the fabric surface. The cathode cake then prevented the passage of solids and a clear filtrate would result. A fabric member is, therefore, quite serviceable for the liquid-pervious surfaces in the prior art electrofilters.

However, in the crossflow electrofilter, the velocity of the slurry across the liquid-pervious surface is great enough to sweep away any substantial cake buildup. In this situation, then, solids will continuously pass into the filtrate channel through a fabric material with the filtrate, and this can amount to a substantial loss of product. Accordingly, a "tighter" surface is highly desirable in the crossflow electrofilter. It has been found that microporous membranes of polymer, ceramic or stainless steel or anisotropic cellulosic or polymer ultrafiltration membranes do not permit the solids to pass into the interior of the cathode assembly, while allowing the liquid filtrate, under pressure, to so pass. Membranes of this type provide a positive barrier to passage of solids and are, therefore, more suitable than fabric members for the crossflow electrofilter.

The fabric surface was also operative at the anode assembly in the prior art electrofiltration apparatus, but had the disadvantage that anolyte was electroosmotically pumped from the interior of the anode assembly into the bath of suspended solids through the cake deposited on the anode assembly, contaminating both the filter cake and the bath. The fabric surface also permitted some fine solids to pass into the anode assembly, at least until a filter cake was established on the anode assembly.

In the system of the present invention, only a very thin cake, or no cake at all, is present on the surface of the anode assembly due to the shearing effect of the flowing slurry. Therefore, a positive barrier to entry of the fine suspended particles into the anode assembly is essential. Such positive barriers may be provided by ion exchange membranes or, as explained above, by microporous membranes or anisotropic polymeric membranes. Of these membranes, however, only the ion exchange membrane will prevent back migration or electroosmotic pumping of electrolyte through the membrane into the filter cake, if present, and into the concentrated slurry. Where back migration cannot be tolerated due to product purity considerations, then only an ion exchange membrane can be employed. Where some degree of anolyte migration into the cake or concentrated slurry is tolerable, or even desirable, the other types of membranes may be considered for use.

Figure 2:
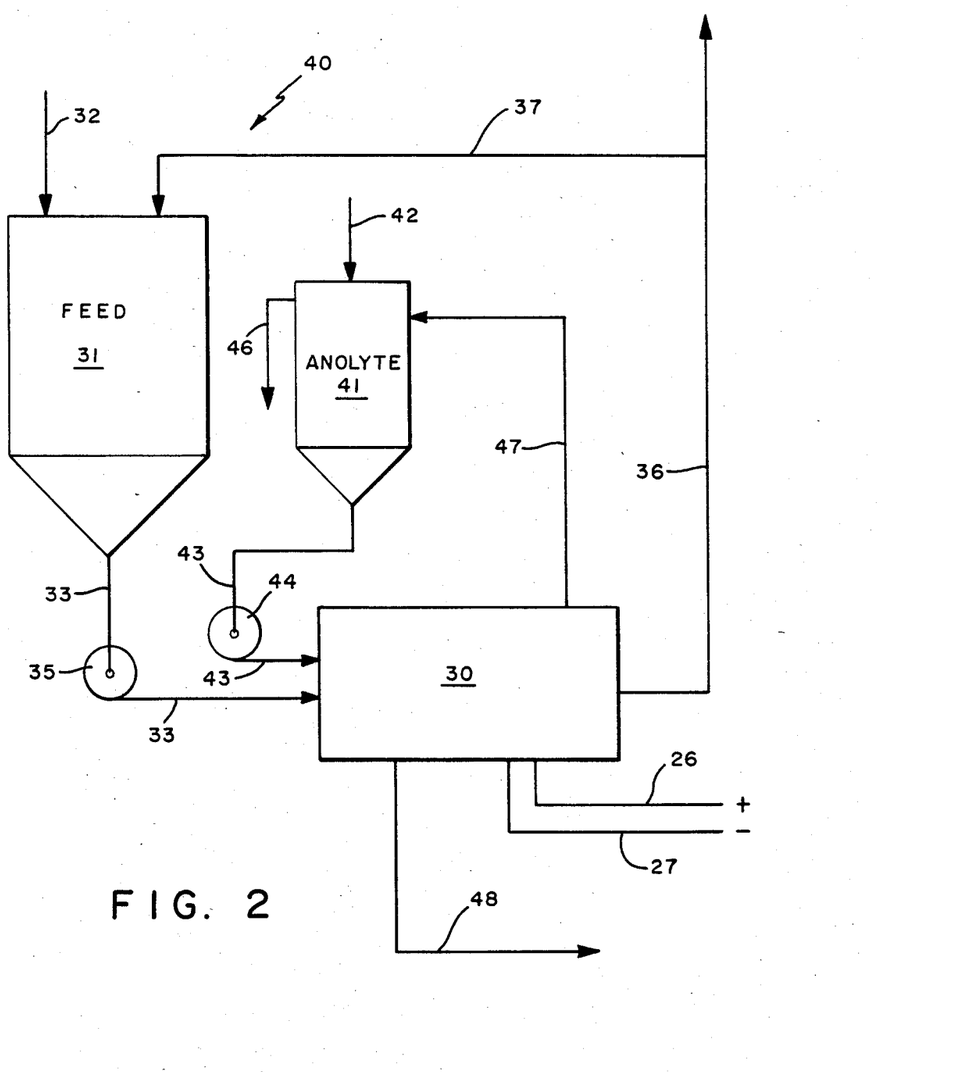
FIG. 2 is a flow diagram of crossflow filtration system.

In the flow diagram of FIG. 2, a crossflow electrofiltration unit 30 is illustrated in a crossflow filtration system 40 capable of providing the necessary feed slurry and anolyte flows to the electrofiltration unit 30. A slurry feed tank 31 has an inlet 32 and a feed outlet conduit 33 with a slurry feed pump 35 therein. The feed outlet conduit 33 is connected to the crossflow electrofiltration unit 30, where, for example, it supplies slurry to the feed product channels 13 as shown in FIG. 1. The product stream which issues from channels 13 is carried away by the product outlet conduit 36. A portion of the product stream may be returned to the feed tank 31 through product recycle line 37. The anolyte circuit for supplying anolyte to the anode assembly members 11 (of FIG. 1) includes an anolyte tank 41 having an inlet 42 for fresh anolyte and anolyte outlet conduit 43 which has an anolyte pump 44 therein. The anolyte outlet conduit 43 is connected to the anode assemblies 11 in the crossflow electrofiltration unit 30. A recycle anolyte conduit 47 is provided for returning anolyte which has passed through the anode assembly members 11 to the anolyte tank 41. A portion of the anolyte recycle may be discarded through line 46 to maintain a constant anolyte conductivity at a fixed volume. Electrical conductors 26 and 27 are connected to the crossflow electrofiltration unit 30 for establishing the electrical potential provided across the feed product channels 13. The filtrate outlet conduit 48 is provided for conducting away the liquid which has been removed through the cathode filter media 23 (of FIG. 1).

Figures 3, 3A, 4:
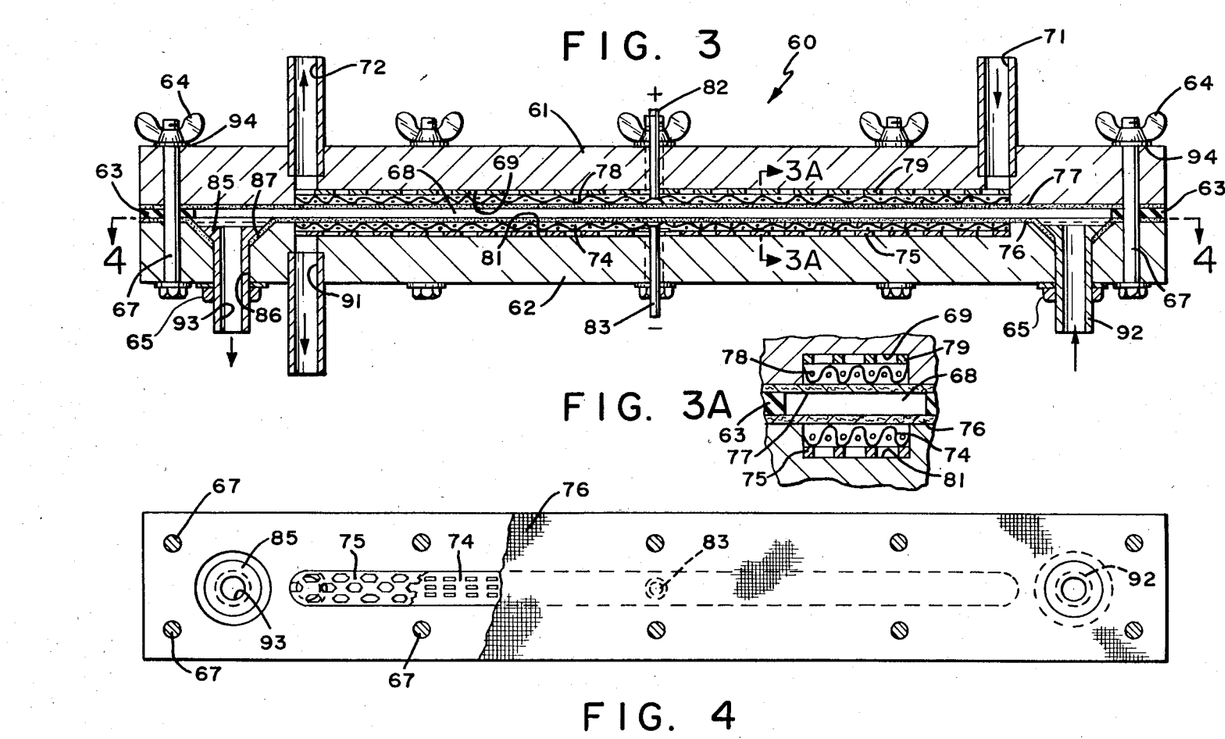
FIG. 3 is a view in section of an embodiment of the electrically augmented crossflow filter device of the invention.
FIG. 3A is a view taken along line 3A—3A of FIG. 3.
FIG. 4 is a view of the crossflow filter device taken along line 4—4 of FIG. 3.

In FIG. 3, another embodiment of the crossflow filter unit is illustrated. The crossflow filter device 60 has an upper housing 61 and a lower housing 62, which are spaced from each other by a resilient sealing gasket 63. The upper and lower housings are preferably made of an electrically non-conductive material; for example, fiberglass reinforced polyester, polysulfone, polypropylene. Alternatively, the housings may be formed of metal with an electrically non-conductive coating thereon, such as a polymer or ceramic coating layer. A plurality of conventional fastening means, such as the nuts 64, washers 94, and bolts 67, secure together the upper housing 61, the lower housing 62, and the sealing gasket 63. The sealing gasket 63 and the adjacent surfaces of the upper housing 61 and lower housing 62 define a feed-product channel 68 lying between the upper and lower housings. Recessed into the upper housing 61 is an electrolyte channel 69 which extends along feed-product channel 68, but which does not extend the full length of the feed-product channel. At one extremity of the electrolyte channel 69, it communicates with an electrolyte inlet 71 which passes through upper housing 61, while at the other extremity of the electrolyte channel 69 it is in communication with the electrolyte outlet 72 which also passes through the upper housing 61. An electrode element 79 is positioned in electrolyte channel 69 and may take the form of an expanded metal sheet lying next against the wall of the electrolyte channel. A non-conductive spacing element 78 is also positioned in the electrolyte channel 69 and an ion-pervious surface member 77 is positioned over electrolyte channel 69, and situated between the gasket 63 and housing 61. The fastening means 64, 94 and 67 thereby secures the ion-pervious surface member 77 between the gasket 63 and the housing 61. It will thus be seen that the ion-pervious surface member 77 separates the electrolyte channel 69 from the feed product channel 68. The nonconductive spacer element 78 supports the surface member 77 in position where it lies over the electrolyte channel 69.

The lower housing 62 of the crossflow electrofiltration unit 60 is somewhat similar in configuration to the upper housing 61 in that it has a filtrate channel 81 which faces and is generally coextensive with the electrolyte channel 69 of the upper housing 61. In filtrate channel 81 is an electrode element 75, and a non-conductive spacer element 74, just as in the electrolyte channel 69. In addition, a liquid-pervious filter medium 76 is mounted between the lower housing 62 and the sealing gasket 63 in just the same manner as the ion-pervious surface member 77. Thus, the fastening means 64, 94 and 67 also functions to secure the filter medium 76 in position, forming one wall of the feed product channel 68. A conductive electrode stud 82 extends through upper housing 61 to establish electrical contact with the electrode element 79 while a second electrode stud 83 passes through lower housing 62 to provide electrical connection to electrode element 75. At one extremity of the filtrate channel 68, it is in communication with a filtrate outlet 91 which passes through the lower housing 52. Communicating with the feed-product channel 68 beyond the ends of the filtrate channel 81 and electrolyte channel 69 are a threaded feed inlet member 92 which passes through the lower housing 62 at one extremity of the feed-product channel 68 while a threaded product outlet member 93 communicates with the feed-product channel 68 at the opposite extremity thereof. The bore 86 for product outlet 93 has a conically counter-bored upper portion 87 in which conical flange 85 of threaded product outlet member 93 is seated. The nut 65 is provided on member 93 so that the outlet member 93 can be drawn down to move flange 85 toward engagement with conical surface 87. A similar arrangement is provided at feed inlet 92. Holes are provided in the filter medium 76 to mate with the bores at the feed inlet member 92 and product outlet member 93. The edges of the fabric surrounding the holes in the filter medium 76 are fixed between the conical surface 87 and the conical flange 85 to provide a seal at that point so that feed slurry cannot intrude beneath the filter medium 76.

The liquid-pervious filter medium may be a fabric, such as Dynel (a copolymer of vinyl chloride and acrylonitrile), an "open" filter. Where very fine or ultrafine particles predominate in the slurry, a microporous polymer membrane, which will retain particle sizes above 20 mm, may be employed. For suspensions containing still finer particles, an anisotropic polymer ultrafiltration membrane capable of retaining particles in the range from 2 to 20 mm may be used.

In operation, a feed is introduced into the inlet feed member 92 and flows through the feed-product channel 68 and a product flow exits the crossflow filtration unit 60 through the product outlet 93. At the same time, an electrolyte is introduced into the electrolyte channel 69 through the electrolyte inlet 71 and passes through the electrolyte channel 69 to exit through the electrolyte outlet 72. An electric field is established across the feed-product channel 68 by connecting electrode studs 83 and 82 to an external electrical circuit. A pressure differential is established across the membrane 76 by the pumps driving the feed through the feed product channel 68. A vacuum source can be connected to filtrate outlet 91 to supplement the differential pressure across membrane 76. A liquid component of the feed slurry passes through the filter media 76 into filtrate channel 81 and exits from the crossflow filtration unit 60 through the filtrate outlet 91. Thus, as the feed advances through the feed-product channel 68, it becomes progressively richer in the solid components thereof and, consequently, a product issues from product outlet 93 which is substantially enriched in solids content when compared with the feed.

EXAMPLE 1

Comparative tests were performed on the crossflow electrofilter and the conventional electrofilter using a kaolin slurry feed identified as predispersed 'HT' clay, obtained from Engelhard Minerals and Chemicals Corporation, made up with various percent solids content.

The crossflow electrofilter used in these tests employed a Dynel fabric as the cathodic surface and a cation exchange membrane as the anodic surface.

The results obtained with the crossflow electrofilter in a device similar to that illustrated in FIG. 3 are summarized in the following Table I:

TABLE I

| Crossflow Electrofilter Test No. | Feed Percent Solids | Filtrate Flux (gal/ft²-hr) | Specific Energy (Kw-hr/Kgal) | *CPP(1) (gal/Amp-hr) | Current Density (Amp/ft²) |
|---|---|---|---|---|---|
| 1 | 58 | 1.21 | 872 | .04 | 125 |
| 2 | 47 | 4.04 | 810 | .05 | 125 |
| 3 | 33.5 | 8.47 | 803 | .09 | 125 |
| 4 | 53 | .52 | 140 | .05 | 12.5 |
| 5 | 44 | 1.86 | 389 | .06 | 37.5 |
| 6 | 33.5 | 1.45 | 89 | .11 | 12.5 |

*CPP (Cathode Performance Parameter)

Table II, below, sets forth the results obtained with the prior art conventional electrofilter:

TABLE II

| Conventional Electrofilter Test No. | Feed Percent Solids | Filtrate Flux (gal/ft²-hr) | Specific Energy (Kw-hr/Kgal) | CPP(1) (gal/Amp-hr) | Current Density (Amp/ft²) |
|---|---|---|---|---|---|
| A | 53 | 1.56 | 677 | .08 | 20.8 |
| B | 43 | 2.68 | 592.5 | .12 | 23.2 |
| C | 34.5 | 3.00 | 482.8 | .14 | 20.9 |

Comparing the results of Tables I and II, it is seen that high filtration rates (see tests 2 and 3) are obtainable at high current densities in the crossflow electrofilter. Energy costs per 1000 gallons of filtrate are lower than experienced in the current electrofilter when current densities used in the crossflow filter device are roughly equal to the values employed in the current electrofilter, both the filtrate rate is then also less than that of the current electrofilter.

Thus, in addition to a much less complex device and simpler operation, the crossflow electrofilter of the present invention makes available a wider choice of operational conditions and so is more flexible in meeting the requirements of particular applications.

The velocity required to maintain the anode surface free of cake is a function of both the feed solids and the current density. As solids increase, the velocity required also increases. As higher current densities are used, the required velocity increases. The velocities used in Table 1 range from 4.0 ft/sec (for Test 5) to 13 ft/sec (for Test 1).

EXAMPLE 2

The performance of a cross flow electro-ultrafilter was tested using a 30% by weight kaolin HT grade feed obtained from Engelhard Minerals. The feed conductivity was 1250 micromhos, the feed pH was 6.5.

The cross flow velocity of the feed across the membrane was provided by an inlet pressure of 30 psi from a single circulating pump as described in FIG. 2. The permeate channel was placed under vacuum to increase the permeate driving pressure. The anolyte used was a $Na_2SO_4$ solution adjusted to 40,000 micromhos conductivity. The anode isolating membrane was a cation ion exchange resin membrane obtained from Sybron Corp.

The ultrafiltration membrane used was S-10 from Dorr-Oliver.

The results are summarized in Table III.

TABLE III

| Current Density Amp/ft$^2$ | Permeate Vacuum Level (in. Hg) | Crossflow Velocity ft/sec | Permeate Rate Gal/ft$^2$ day |
| --- | --- | --- | --- |
| 0 | 28 | 4.72 | 71 |
| 17.2 | 28 | 4.72 | 130 |
| 34.6 | 28 | 4.72 | 190 |
| 52 | 28 | 4.72 | 260 |
| 0 | 0 | 4.72 | 43 |
| 17 | 0 | 4.72 | 107 |
| 35 | 0 | 4.72 | 178 |
| 52 | 0 | 4.72 | 238 |

Referring now to Table III, the use of electric fields to augment the permeate rate from an ultrafiltration device is clearly demonstrated. In this case, the application of a current density of about 50 Amp/ft$_2$ produces a permeate rate roughly 4 times greater than that obtained with no current applied. Also, an advantage of from 10 to 25 gfd in permeate rate is obtained when both electric field and vacuum are applied as contrasted to the situation when only the electric field is applied.

There are basically four schemes for utilizing the crossflow electrofiltration process:

A. Single Pass

Figure 5:
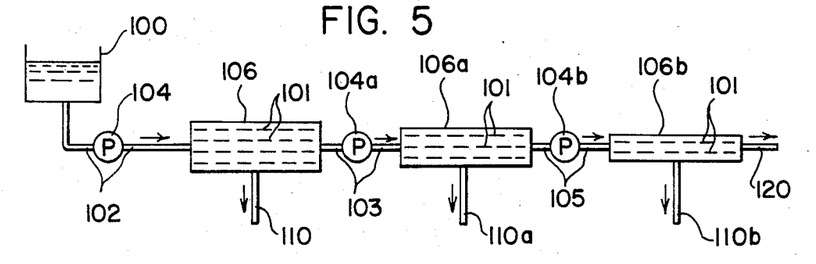
FIG. 5 is a flow diagram of the electrically augmented crossflow filter device of the invention, shown in a single pass system for processing a feed slurry.

As shown in FIG. 5, the feed slurry is pumped from feed tank 100 through conduit 102 by pump 104 to crossflow electrofiltration cell 106. In electrofiltration cell 106, the feed slurry passes through parallel channels between electrode elements 101. The crossflow electrofiltration cells 106, 106a and 106b are arranged in series to progressively concentrate the slurry with the filtrate removed from each cell through the outlets 110, 110a and 110b, respectively, the final product exiting the last electrofiltration cell 106b of the series through conduit 120.

In this configuration, the crossflow velocity in the channels of cell 106 decreases as filtrate is removed. Reducing the number of parallel flow paths in the cells 106a and 106b in subsequent stages compensates for this. The staged arrangement is necessary because of pump limitations. Each stage has its own pumping station; pump 104a, positioned in conduit 103, acting on the partially concentrated slurry from cell 106 present in conduit 103 to introduce it into cell 106a, and pump 104b in conduit 105 similarly forces the partially concentrated slurry from cell 106a on into cell 106b. The additional pumping stations increase the capital cost of such an installation.

B. Batch-Open Loop

Figure 6:
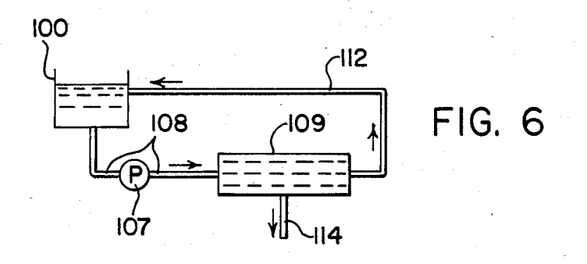
FIG. 6 is a flow diagram of the electrically augmented crossflow filter device of the invention, shown in a batch-open loop system for processing a feed slurry.

As shown in FIG. 6, the feed is pumped by pump 107 from feed tank 100 through conduit 108 into the crossflow electrofiltration cell 109 and returned to the feed tank through conduit 112. The electrofiltration cell 109 dewaters the feed incrementally during each pass with the filtrate removed through outlet 114, but is sized so the degree of concentration between the feed and concentrate streams at any point in time is small. The concentrated product is obtained in this system by shutting down the process and draining feed tank 101. This system is the most efficient from a capital cost per unit productivity and operating cost standpoint, but introduces long residence times which may be detrimental if the solids are susceptible to shear degradation or microbiological contamination.

C. Batch-Closed Loop

Figure 7:
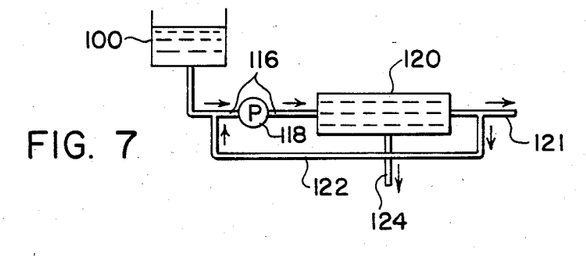
FIG. 7 is a flow diagram of the electrically augmented crossflow filter device if the invention, shown in a batch-closed loop system for processing a feed slurry.

In FIG. 7, there is illustrated a system in which the feed from feed tank 100 is pumped through conduit 116 by pump 118 into a volume recirculating by means of conduit 122 around the crossflow electrofiltration cell 120, while the filtrate is removed through line 124 and the product is removed through outlet 121 from that same volume. The recirculating concentration is constant at the desired product solids content. This is the least efficient from a pumping velocity and dewatering standpoint, but reduces residence time.

D. Staged System

Figure 8:
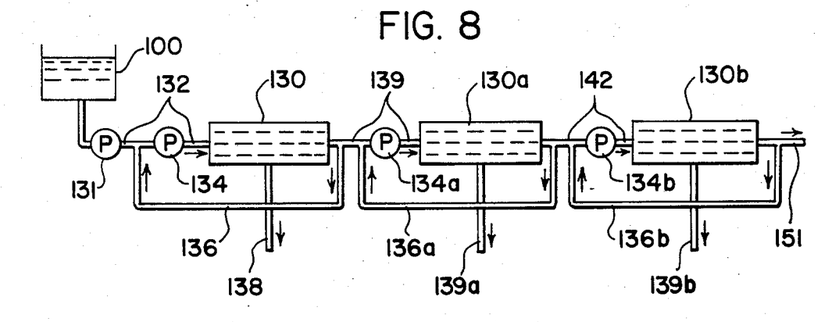
FIG. 8 is a flow diagram of the electrically augmented crossflow filter device of the invention, shown in a staged system for processing a feed slurry.

This system, as seen in FIG. 8, replaces the stages of the single pass system with closed loop stages. Thus, pump 131 in conduit 132 introduces slurry from feed tank 100 into a first stage containing the crossflow electrofiltration cell 130. A volume of slurry recirculates about electrofiltration cell 130 through conduit 136 and the pressure in the stage is incrementally increased by stage pump 134 which also increases crossflow velocity in cell 130. Filtrate is removed from the cell 130 through line 138 while concentrated slurry is removed from the circulating volume through conduit 139. The electrofiltration cell/recirculation conduit stage is replicated in this system in a series configuration. Thus, the product or bleed of the first stage is pumped through conduit 139 by pump 134a to the cell 130a, while conduit 136a recirculates concentrated slurry to conduit 138. Filtrate is withdrawn from cell 130a through line 139a while the stage product is removed from the circulating volume of slurry through conduit 142. The final stage is essentially identical with the preceding stages; the pump 134b, cell 130b, filtrate line 139b and recirculating conduit 136b functioning in the same way that similar elements functioned in the prior stages. The final product of the last stage is withdrawn through outlet 151.

It will be seen in this last system that a base pump pressure is provided for the cells 130, 130a and 130b by pump 131; that base pressure appearing at the inlet of pump 134. Pump 134 provides an increment of pressure for the suspension in cell 130 to augment the differential pressure across the liquid-pervious filter members of the cell to thereby increase the flow of filtrate. Each stage in this system has a pump for providing an increment of pressure to the base pressure of the feed entering the stage.

The processing economic benefits of the open loop system are approached, with better energy utilization and control than the single pass system. Each stage operates at a fixed concentration, the stage bleed being the feed for the next stage.

In some cases, it may be desirable to add a dispersant to the feed to keep the slurry dispersed and to prevent plugging of the feed-product channel, which latter may be of the order of one-eighth inch in depth as measured between the opposed filter medium and the ion-pervious member. The dispersants employed may be tetrasodium pyrophosphate (TTSP) or ammonium polyacrylate, for example. The dispersant may instead be added to the anolyte; relying on electroosmotic pumping to introduce anolyte with dispersant therein into the feed-product channel.

In some cases, the suspended solids may have a positive surface charge rather than the negative surface charge characteristic of clay and polyvinylchloride. In such a case, the anode would be provided with a filter medium, while an ion-pervious member would be provided for the cathode.

In U.S. Pat. No. 4,107,026, referred to above, and in U.S. Pat. No. 4,246,039, issued Jan. 10, 1981, the use of an electrofilter to concentrate a feed to a spray dryer is disclosed. The electrically augmented crossflow filter device of the present invention could, of course, be employed in a system for producing a dry powder product in combination with a spray dryer station with means, for example, a conduit, for feeding the thickened product slurry of the crossflow filter to the spray drying station.

In the above description, various membranes have been mentioned as suitable for use under specified conditions in the crossflow electrofilter, including ion exchange membranes, microporous membranes and anisotropic polymer membranes. A suitable cationic exchange membrane is a perfluorosulfonic acid membrane which is sold under the trademark, NAFION, by E.I. DuPont de Nemours and Company. A suitable anionic exchange membrane is composed of an ammoniated polystyrene/polyvinylidene fluoride mixture on polypropylene cloth and is available from Sybron Chemicals Incorporated of Birmingham, New Jersey. Suitable microporous membranes are composed of polymers such as polysulfone prepared by a phase inversion casting technique and are available from Millipore Corporation of Lexington, Massachusetts. Anisotropic polymer membranes are also composed of polymers such as polysulfone prepared by a phase inversion casting technique as described in U.S. Pat. No. 3,615,024, issued Oct. 26, 1971 in the name of A. S. Michaels.

As used herein, the term ion exchange membranes, refers to membranes which are (1) hydraulically impermeable or essentially impermeable and (2) ion conducting, i.e. able to transport ions freely under the action of an applied electric field. Such membranes can be either cation selective, passing essentially only cations, or they can be anion selective, passing only anions, and they can be non-selective, being essentially indifferent as to which ionic charge species is allowed to pass.

Since it is possible that the pores of the cathode filter media may be blinded and clogged by the suspended solids of the slurry, the present invention also provides for a protective screen to be placed over the open cathode filter media. This screen permits the free flow of filtrate into the cathode structure while also allowing a gel or thin layer of suspended solids to form on the screen without penetrating, blinding or clogging the pores of the filter media. The screen preferably should be of an inert (plastic) material such as polypropylene. It should also have holes whose diameters are less than their length.

Although the present invention has been described in conjunction with preferred embodiments, it is to be understood that modification and variation may be resorted to without departing from the spirit and scope of the invention, as those skilled in the art will readily understand.

We claim:

1. An electrically augmented crossflow filter device for dewatering a slurry comprising a housing, a narrow, elongated feed-product channel within said housing, a feed inlet at one extremity of said feed-product channel, said feed-product channel defined in part by a pair of opposed walls, a filtrate channel lying parallel to said feed-product channel and contiguous with a first of said walls, said first wall comprising a filter medium, an electrode element of a first polarity in said filtrate channel, a filtrate outlet for withdrawing filtrate from said filtrate channel, an electrolyte channel lying parallel to said feed-product channel and contiguous with the second of said walls, said second wall comprising an ion-pervious member, an electrode element of a second polarity in said electrolyte channel, means for circulating an electrolyte solution through said electrolyte channel to immerse said electrode element therein in a flowing stream of electrolyte, said means for circulating electrolyte including first and second conduits in flow communication with said electrolyte channel, said first conduit being connected to an electrolyte supply tank such that electrolyte is circulated to said electrolyte channel via said first conduit by electrolyte pumping means and recycled to said electrolyte tank via said second conduit, means for establishing a pressure differential between said feed-product channel and said filtrate channel across said first wall and means for establishing an electric field perpendicular to the axis of said feed-product channel between said electrode elements.

2. The electrically augmented crossflow filter device of claim 1 wherein the first of said walls is an anisotripic polymeric membrane.

3. The electrically augmented crossflow filter device of claim 2 wherein said anisotropic polymeric membrane is a polysulfone membrane.

4. The electrically augmented crossflow filter device of claim 2 wherein said anisotropic polymeric membrane is a cellulosic membrane.

5. The electrically augmented crossflow filter device of claim 1 wherein the first of said walls is a cloth fabric filter medium.

6. The electrically augmented crossflow filter device of claim 5, said cloth fabric being woven dynel cloth.

7. The electrically augmented crossflow filter device of claim 5, wherein a protective screen is placed over said cloth fabric filter medium.

8. A treatment system for producing a dry powder product comprising the electrically augmented crossflow filter device of claim 1 with the addition of a spray drying station and means for feeding the thickened product slurry of said crossflow filter device to said spray drying station.

9. The electrically augmented crossflow filter device of claim 1 wherein the first of said walls is a microporous membrane.

10. The electrically augmented crossflow filter device of claim 9 wherein said microporous membrane is a stainless steel, ceramic or polymeric microporous medium.

11. The electrically augmented crossflow filter device of claim 1 wherein the first of said walls is subject to vacuum applied to said filtrate outlet, said vacuum acting to withdraw said filtrate from said filtrate channel.

12. The electrically augmented crossflow filter device of claim 1 wherein the second of said walls comprises a substantially hydraulically impermeable ion pervious membrane.

13. The electrically augmented crossflow filter device of claim 1 wherein the second of said walls is an ion exchange membrane.

14. The electrically augmented crossflow filter device of claim 13 wherein said ion exchange membrance is a cationic membrane, allowing the passage substantially only of cations.

15. The electrically augmented crossflow filter device of claim 13 wherein said ion exchange membrane is an anionic membrane, allowing the passage substantially only of anions.

16. The electrically augmented crossflow filter device of claim 13 wherein said ion exchange membrane is non-selective, said membrane allowing the passage of both anions and cations.

17. The electrically augmented crossflow filter device of claim 13, wherein said ion exchange membrane is hydraulically permeable.

18. A process for dewatering a slurry in an electrically augmented crossflow filter device, said electrically augmented crossflow filter device comprising a housing, a narrow, elongated feed-product channel within said housing, a feed inlet at one extremity of said feed-product channel, said feed-product channel defined in part by a pair of opposed walls, a filtrate channel lying parallel to said feed-product channel and contiguous with a first of said walls, said first wall comprising a filter medium, an electrode element of a first polarity in said filtrate channel, a filtrate outlet for withdrawing filtrate from said filtrate channel, an electrolyte channel lying parallel to said feed-product channel and contiguous with the second of said walls, said second wall comprising an ion-pervious member, an electrode element of a second polarity in said electrolyte channel, means for passing an electrolyte solution through said electrolyte channel to immerse said electrode element therein in a flowing stream of electrolyte, means for establishing a pressure differential between said feed-product channel and said filtrate channel across said first wall and means for establishing an electric field perpendicular to the axis of said feed-product channel between said electrode elements, comprising:

pumping slurry into said feed-product channel;

maintaining a velocity of said slurry in said feed-product channel sufficient to inhibit deposition of solids from said slurry on the walls of said channel;

establishing an electric field perpendicular to the axis of said feed product channel between the opposed electrode elements located in said filtrate channel and said electrolyte channel;

withdrawing filtrate;

continuously circulating electrolyte through said electrolyte channel whereby the electrode therein is immersed in electrolyte; and withdrawing a slurry enriched in solids content from said feed-product channel.

19. The process of claim 18 wherein the velocity of said slurry in said feed-product channel is from about 1 to about 20 ft/sec.

20. The process of claim 19 wherein the current density due to the applied field is between about 0.1 and about 135 amps/ft$^2$.

21. The process of claim 18 wherein vacuum is applied to said filtrate channel.

22. The process of claim 18 wherein the solids have an average particle size of less than 100 microns.

23. The process of claim 18 wherein the solids have an average particle size of less than 10 microns.

24. The process of claim 18 wherein a dispersant is added to the suspension of solids to prevent plugging of the channel between adjacent electrode assemblies.

25. The process of claim 18 wherein dispersant is incorporated in said anolyte and is electroosmotically pumped with said anolyte into the feed-product channel.

26. The process of claim 18 wherein the solids of said slurry have a positive surface charge.

27. The process of claim 18 wherein the suspended solids of said slurry have a negative surface charge.

28. The process of claim 18, wherein the suspended solids of said slurry is at least one selected from the group consisting of kaolin, PVC, fine coal, alumina, $T_1O_2$, calcium carbonate, humate, magnesium aluminum hydroxide, and other polymer latexs.

* * * * *